(12) United States Patent
Murayama

(10) Patent No.: US 8,289,890 B2
(45) Date of Patent: Oct. 16, 2012

(54) PRINTING APPARATUS AND METHOD OF CONNECTING SAME

(75) Inventor: Michihei Murayama, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 560 days.

(21) Appl. No.: 11/677,226

(22) Filed: Feb. 21, 2007

(65) Prior Publication Data

US 2007/0201389 A1     Aug. 30, 2007

(30) Foreign Application Priority Data

Feb. 24, 2006  (JP) .................... 2006-048974

(51) Int. Cl.
  *H04B 7/00*     (2006.01)
  *G06F 3/12*     (2006.01)
  *H04M 3/42*     (2006.01)

(52) U.S. Cl. .............. 370/310; 358/1.15; 455/414.1

(58) Field of Classification Search ............ 370/338, 370/328, 349
  See application file for complete search history.

(56) References Cited

U.S. PATENT DOCUMENTS

| | | | | |
|---|---|---|---|---|
| 6,886,095 | B1* | 4/2005 | Hind et al. ................. | 713/168 |
| 7,245,602 | B2* | 7/2007 | Skubic et al. ................ | 370/338 |
| 7,283,820 | B2* | 10/2007 | Kamijo et al. ............ | 455/435.1 |
| 2001/0036273 | A1* | 11/2001 | Yoshizawa .................... | 380/247 |
| 2002/0066042 | A1* | 5/2002 | Matsumoto et al. ........ | 713/202 |
| 2002/0130834 | A1* | 9/2002 | Madarasz et al. ........... | 345/156 |
| 2005/0279833 | A1* | 12/2005 | Tanaka ...................... | 235/462.46 |

FOREIGN PATENT DOCUMENTS

JP  2000-124920 A  4/2000
JP  2005-217646 A  8/2005

OTHER PUBLICATIONS

English Machine Translation of JP 2005-217646.*

* cited by examiner

*Primary Examiner* — Charles N. Appiah
*Assistant Examiner* — Natasha Cosme
(74) *Attorney, Agent, or Firm* — Carter, DeLuca, Farrell & Schmidt LLP

(57) ABSTRACT

A communication apparatus capable of being connected to another communication apparatus generates temporary connection information used in making a wireless connection. The apparatus presents this temporary connection information and makes a wireless connection to another communication apparatus based upon this temporary connection information.

16 Claims, 17 Drawing Sheets

FIG. 12

TEMPORARY PIN CODE DATABASE

| | PIN Code # 1201 | BD ADDRESS 1202 | DEVICE NAME 1203 | DEVICE TYPE 1204 | SET NUMBER OF PRINTS 1205 | SET TIME 1206 | SET NUMBER OF TIMES 1207 | SET NUMBER OF DAYS 1208 |
|---|---|---|---|---|---|---|---|---|
| 1 | Ady315 | Akjdf943 | ABC | A | | | 3 | |
| 2 | U58dk9 | Sks30kf | BCD | A | | | 1 | |
| 3 | Omf93h | Hu763le | PPO | B | | | 3 | |
| | .. | .. | .. | .. | .. | .. | .. | .. |
| | .. | .. | .. | .. | .. | .. | .. | .. |
| | .. | .. | .. | .. | .. | .. | .. | .. |
| | .. | .. | .. | .. | .. | .. | .. | .. |
| | .. | .. | .. | .. | .. | .. | .. | .. |
| N-1 | J75hr9 | Skdlg098 | CCF | C | | | 3 | |
| N | Pom4g6 | Dpnfye73 | CGF | A | | | 0 | |

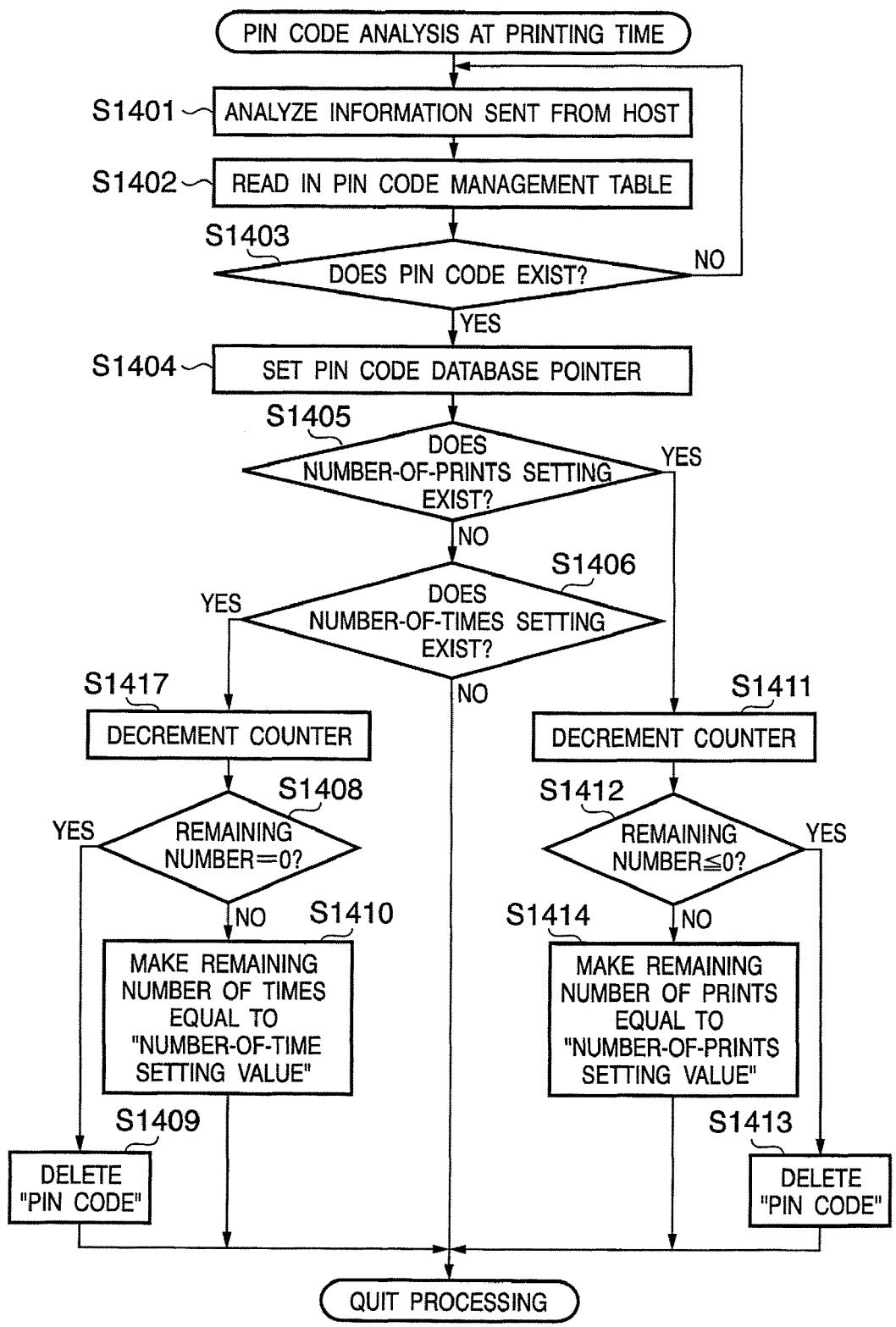

PRINTING APPARATUS AND METHOD OF CONNECTING SAME

BACKGROUND OF THE INVENTION

1. Field of the Invention

The present invention relates to a communication apparatus capable of being wireless connected to another communication apparatus, and to a method of connecting this communication apparatus.

2. Description of the Related Art

A large number of mobile terminals equipped with a wireless function such as Bluetooth (registered trademark) have become commercially available in recent years. These terminals have a function that allows them to be connected directly to a printer and to perform printing without the use of a personal computer. Ordinary wireless devices generally are non-directional and therefore make concurrent use of a PIN code or the like for the purpose of connection security. The device is so adapted that if a PIN code does not match, pairing cannot be achieved and printing cannot be carried out. Once pairing has been achieved, the pairing information is retained. From this point onward, therefore, it is possible to make the connection is simple fashion. In most cases, however, the number of items of information that can be retained as pairing information is limited.

Consequently, if temporary connections and printing from mobile terminals increase and there is an increase in the pairing information, items of connection information become interchanged. Then, when an attempt is made to print from a host to which a connection is to be made primarily, the PIN code must be verified again. This and other inconveniences are encountered.

SUMMARY OF THE INVENTION

Accordingly, the present invention generates temporary connection information, presents this information to another communication apparatus and performs wireless communication with this other communication apparatus.

In accordance with one aspect of the present invention, there is provided a communication apparatus capable of being wirelessly connected to another communication apparatus, comprising: generating device adapted to generate temporary connection information used in a wireless connection; and connecting device adapted to present the temporary connection information and making the wireless connection to the other communication apparatus based upon the temporary connection information.

Further, in accordance with one aspect of the present invention, there is provided a method of connecting to a communication apparatus capable of being wirelessly connected to another communication apparatus, comprising the steps of: generating temporary connection information used in a wireless connection; presenting the temporary connection information; and making the wireless connection to the other communication apparatus based upon the temporary connection information.

Further features of the present invention will become apparent from the following description of exemplary embodiments (with reference to the attached drawings).

BRIEF DESCRIPTION OF THE DRAWINGS

FIG. 9 is a diagram illustrating a case where the "temporary PIN code" shown in FIG. 8 is converted to a QR code or the like;

FIG. 12 is a diagram illustrating the structure of a database of temporary PIN codes issued by a printing apparatus in accordance with circumstances;

FIG. 14 is a flowchart illustrating PIN-code analyzing processing at the time of printing in this embodiment;

DESCRIPTION OF THE EMBODIMENT

A preferred embodiment of the present invention will now be described in detail with reference to the drawings.

In a printing system comprising mobile terminals and a printing apparatus having wireless interfaces in this embodiment, the printing apparatus issues a temporary PIN code, not a regular PIN code for connection purposes, when a mobile terminal has requested connection to the printing apparatus. The mobile terminal performs printing using this PIN code.

Further, the printing apparatus manages the temporary PIN code issued. Thus the printing apparatus is aware of this as "temporary pairing information" separate from original pairing information that uses a PIN code, and reserves the data accordingly. As a result, the printing apparatus manages this as "temporary pairing information" without storing the temporary pairing information and executes printing in conformity with conditions.

Furthermore, a necessary printing-environment setting value is appended to a "temporary PIN code" that a printing apparatus issues to a mobile terminal. This makes possible a function whereby a "temporary PIN code" is provided with a variety of limitations.

For example, information relating to the function and type of a connected device and information such as valid time period and valid number of print pages is appended to the "temporary PIN code" and the information is managed within the printing apparatus. As a result, a database of these "temporary PIN codes" can be utilized effectively.

This embodiment will be described taking as an example a case where a familiar mobile telephone serves as the mobile terminal and use is made of Bluetooth (registered trademark), with which many mobile telephones have come to be equipped in recent years, as the wireless interface.

Further, if a mobile terminal serving as the effective host is truly mobile, the device is not limited to a mobile telephone and may just as well be a PDA (Personal Digital Assistant) or mobile personal computer. Recent mobile telephones and PDAs come equipped with a camera function as a standard feature. A mobile terminal that is capable of analyzing a QR code is the most advantageous host when one considers that is has a function for directly receiving information from a QR code.

Figure 1:
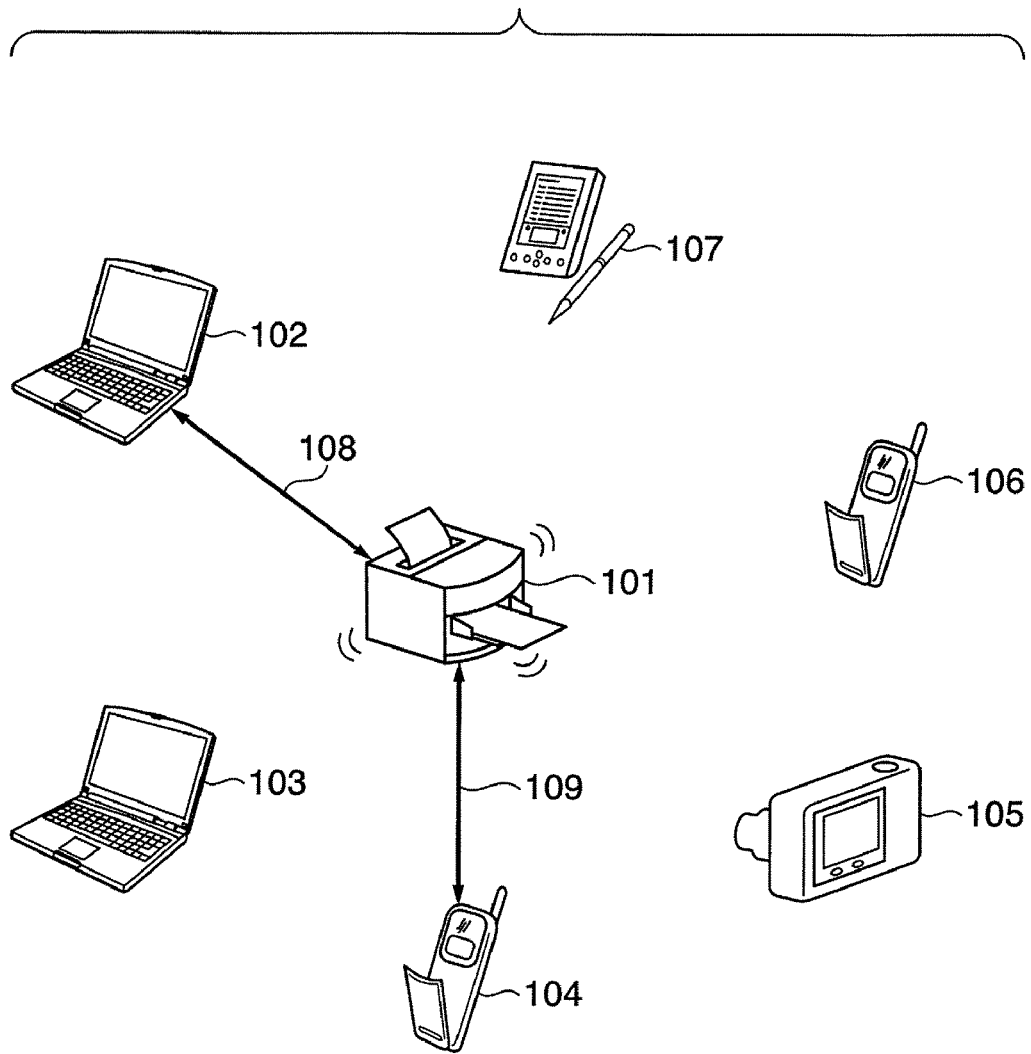
FIG. 1 is a diagram illustrating the relationship between mobile terminals and a printing apparatus having a wireless function.

FIG. 1 is a diagram illustrating the relationship between mobile terminals and a printing apparatus having a wireless function. As illustrated in FIG. 1, mobile terminals 102, 104 shown connected to a printing apparatus 101 by the solid lines are hosts that are usually wirelessly connected to the printing apparatus. Here the mobile terminal 102 is a notebook personal computer and the mobile terminal 104 a mobile telephone. A mobile terminal 103 is a notebook personal computer, and mobile terminals 105, 106 and 107 are a digital camera, a mobile telephone and a PDA, respectively.

Figure 2:
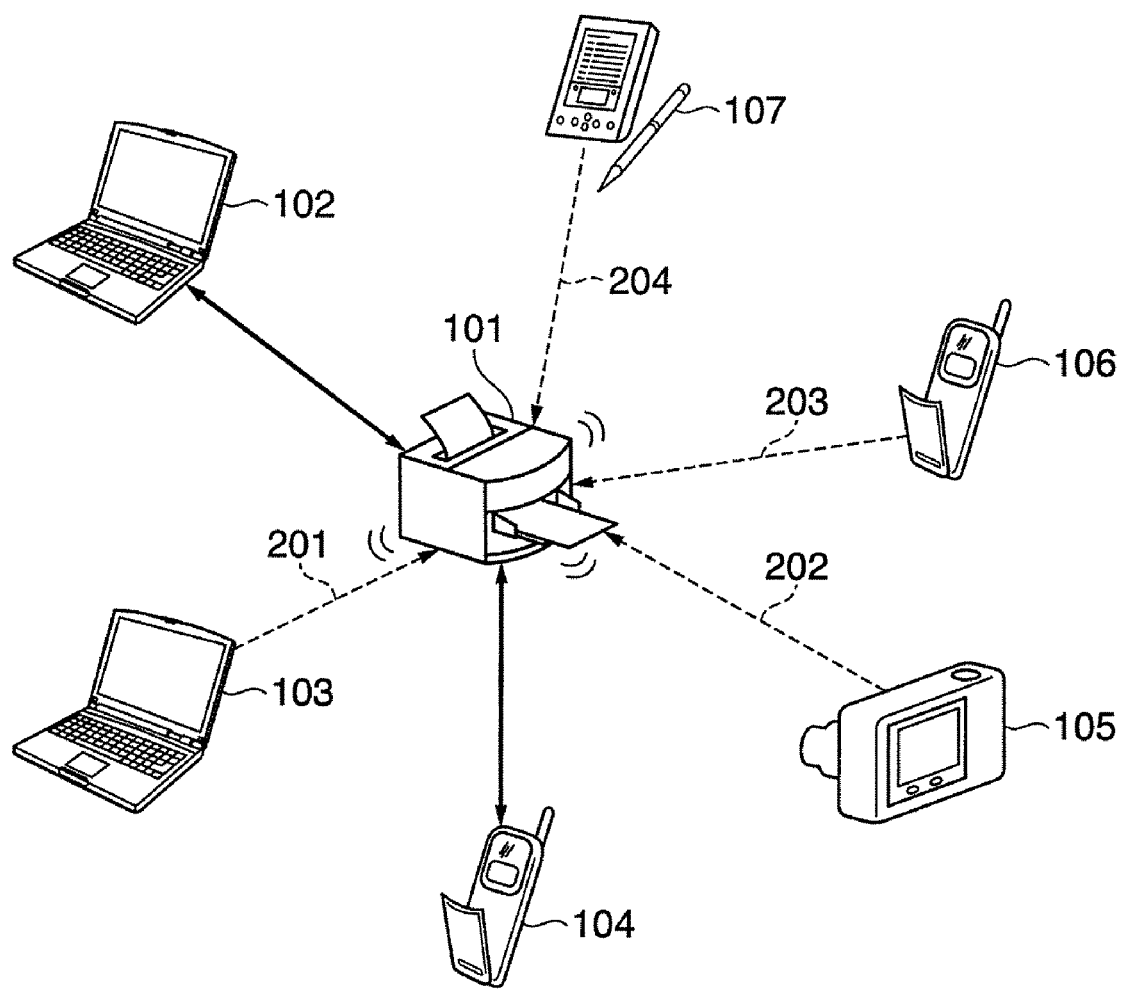
FIG. 2 is a diagram illustrating mobile terminals connected to a printing apparatus temporarily.

FIG. 2 is a diagram illustrating mobile terminals connected to a printing apparatus temporarily. As shown in FIG. 2, mobile terminals 103 and 105 to 107 shown connected to the printing apparatus 101 by broken lines 201 to 204 are all connected temporarily as necessary and are hosts for performing printing.

Further, in a case where a mobile terminal is connected to the printing apparatus 101 and printing is carried out, input of a "PIN code" corresponding to a password necessary for connection is requested from the printing apparatus 101 at the moment the mobile terminal issues a connection request to the printing apparatus 101. An input screen 301 on the mobile terminal is for inputting the PIN code. In a case where a connection is made to the printing apparatus 101 using a wireless interface such as Bluetooth (registered trademark), the connection is non-directional and it is possible to connect to any and all devices. In order to limit connections, a "PIN code" is set. In a case where a PIN code is not input by a mobile terminal, a connection to the printing apparatus 101 cannot be achieved.

Figure 4:
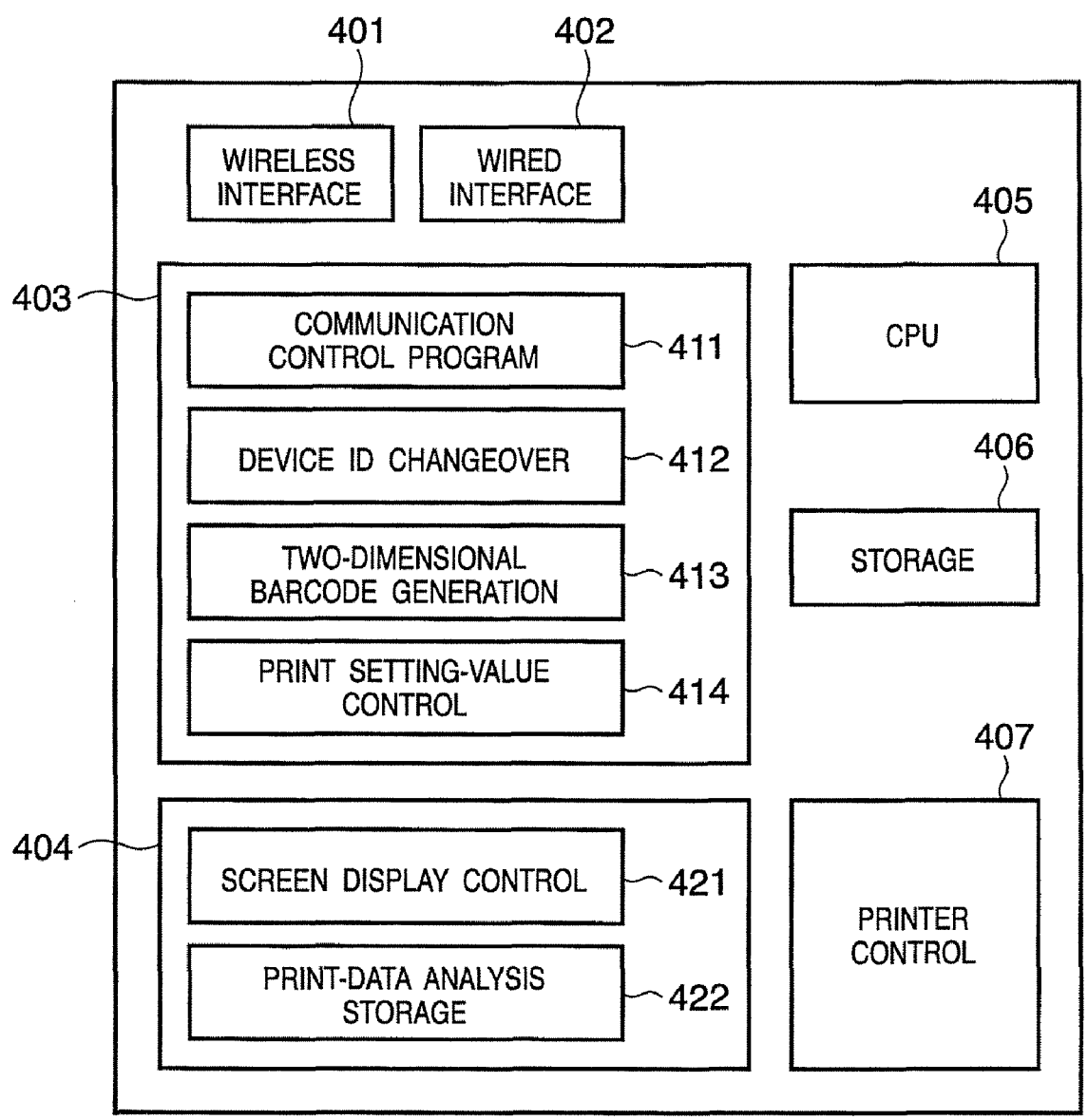
FIG. 4 is a functional block diagram illustrating an example of the configuration of a printing apparatus according to an embodiment of the present invention.

FIG. 4 is a functional block diagram illustrating an example of the configuration of a printing apparatus according to this embodiment. Shown in FIG. 4 are a wireless interface 401 and a wired interface 402. A function module 403 effects a connection utilizing a wireless/wired device, converts a PIN code or print setting value to a QR code and executes display and printing. A module 404 exercises control with respect to data that has been sent to it.

A CPU 405 is connected to the exterior via the wireless interface 401 or wired interface 402, controls the function module 403 and the module 404, performs printing control of transmitted data and exercises overall control up to the actual printing apparatus. A storage unit 406 is for storing information necessary in terms of control. A printer controller 407 executes actual printing based upon control exercised by the CPU 405.

In the function module 403, a communication control program 411 performs control for connection to an external host by controlling the wireless interface 401 and wired interface 402. A device ID changeover unit 412 sets, stores, changes and verifies, etc., an ID code used in order to enhance connection security. The ID code is referred to as a "device ID" (a PIN code in this example). A two-dimensional bar code generator 413 converts the value of the device ID to a QR code in response to a request. A print setting-value controller 414 manages and stores information relating to the printing environment of the printing apparatus, and outputs/inputs this value as necessary. The printing environment information includes, e.g., the size and quality of the currently loaded printing paper, the type (color or monochrome) of printhead and the printing mode (number of pages printed per sheet of paper).

In the module 404, a screen display controller 421 exercises screen control in a case where the printing apparatus is equipped with a display device, and a print-data analysis storage unit 422 forms print data in accordance with the original functions of the printing apparatus and transmitted data, and executes storage processing.

Figure 3:
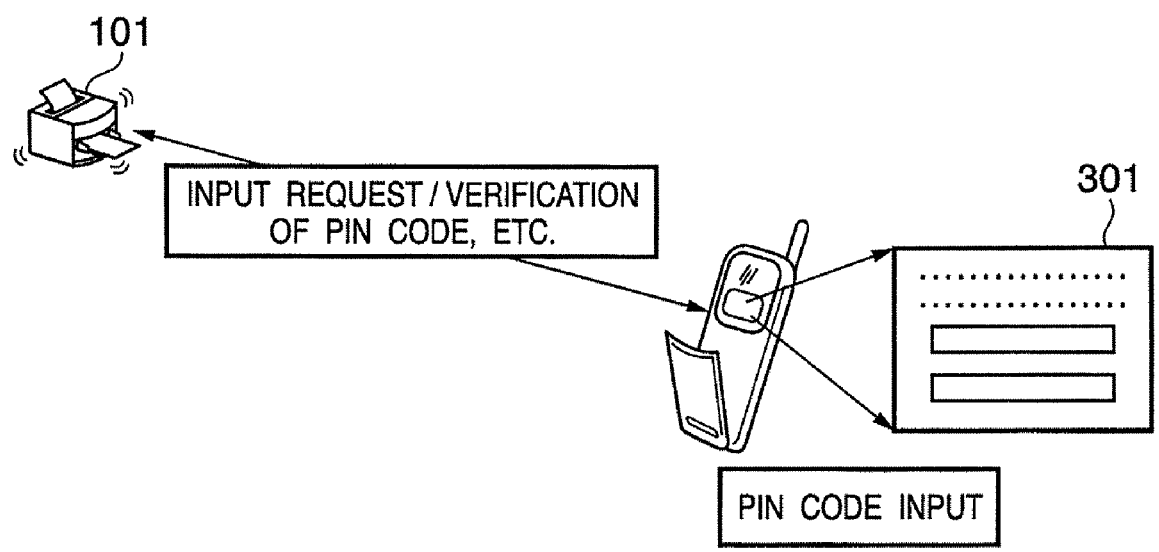
FIG. 3 is a diagram useful in describing a procedure followed when a mobile terminal is wirelessly connected to a printing apparatus.

If a PIN code has been entered correctly using the input screen 301 of FIG. 3 and a connection has been made, the print setting-value controller 414 shown in FIG. 4 stores the connection information (referred to as "pairing information" below). If this is followed by the arrival of a connection request from the same mobile terminal (host), then the connection is made from the information, which has been stored in the printing apparatus 101, without the PIN code being requested again. However, there is usually a limitation upon the stored information and the number of times storage is performed is very small.

Figure 5:
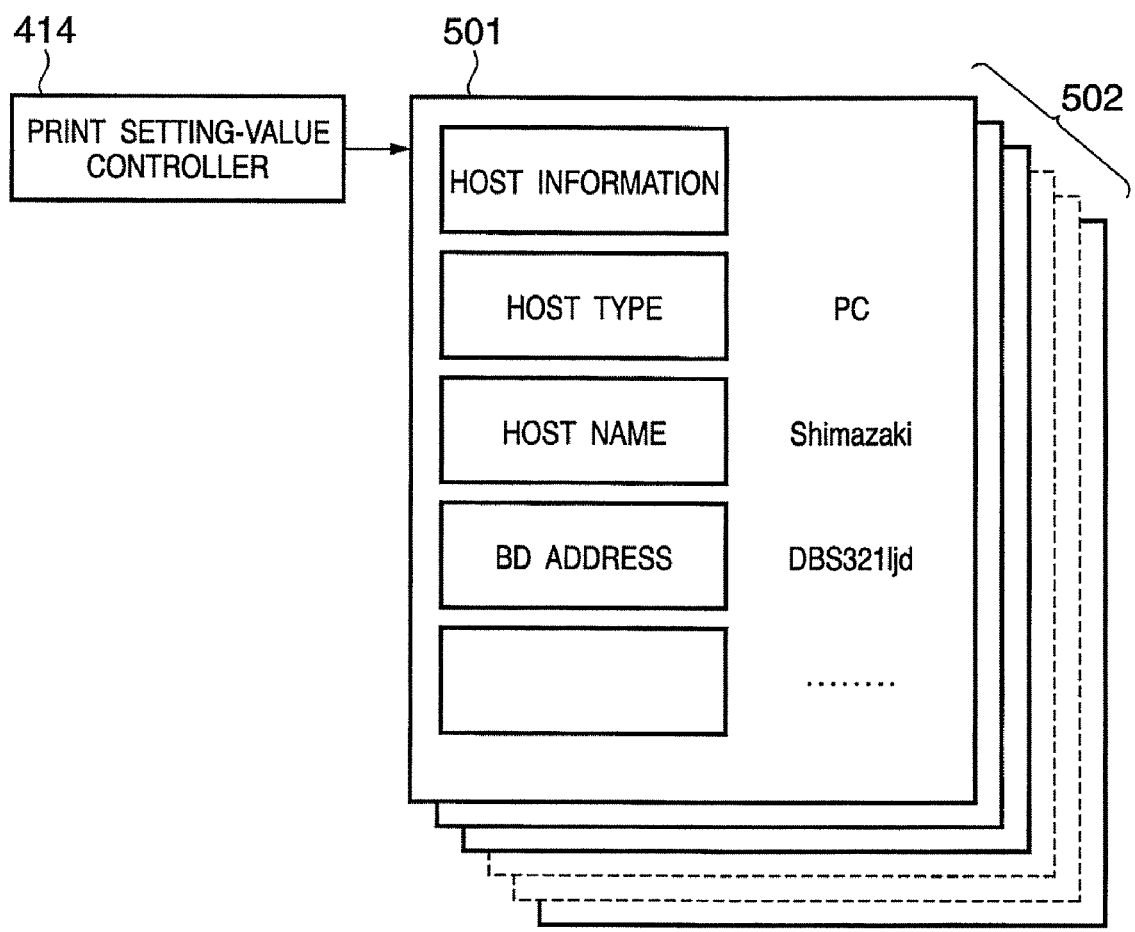
FIG. 5 is a diagram illustrating the content of information contained in pairing information between a printing apparatus and a mobile terminal.

FIG. 5 is a diagram illustrating the content of information contained in pairing information between a printing apparatus and a mobile terminal. As illustrated in FIG. 5, individual items of pairing information 501 include host-side "device name", "BD address" [a Bluetooth (registered trademark) chip-specific address] and "device identifier", etc. These items of information are provided on a per-device basis. Reference numeral 502 denotes a collection of such information for multiple devices. Such information is managed and stored by the print setting-value controller 414.

A "PIN code" used to connect to the printing apparatus as the pairing information usually is not stored in the apparatus. Here the PIN code is a "connection password" necessary to connect to the printing apparatus. Usually one such password is prepared per one printing apparatus, and a plurality thereof do not exist.

Accordingly, when a plurality of hosts connect to a single printing apparatus, even temporarily, and perform printing, this information is stored as "pairing information" in the print setting-value controller 414.

Figure 6:
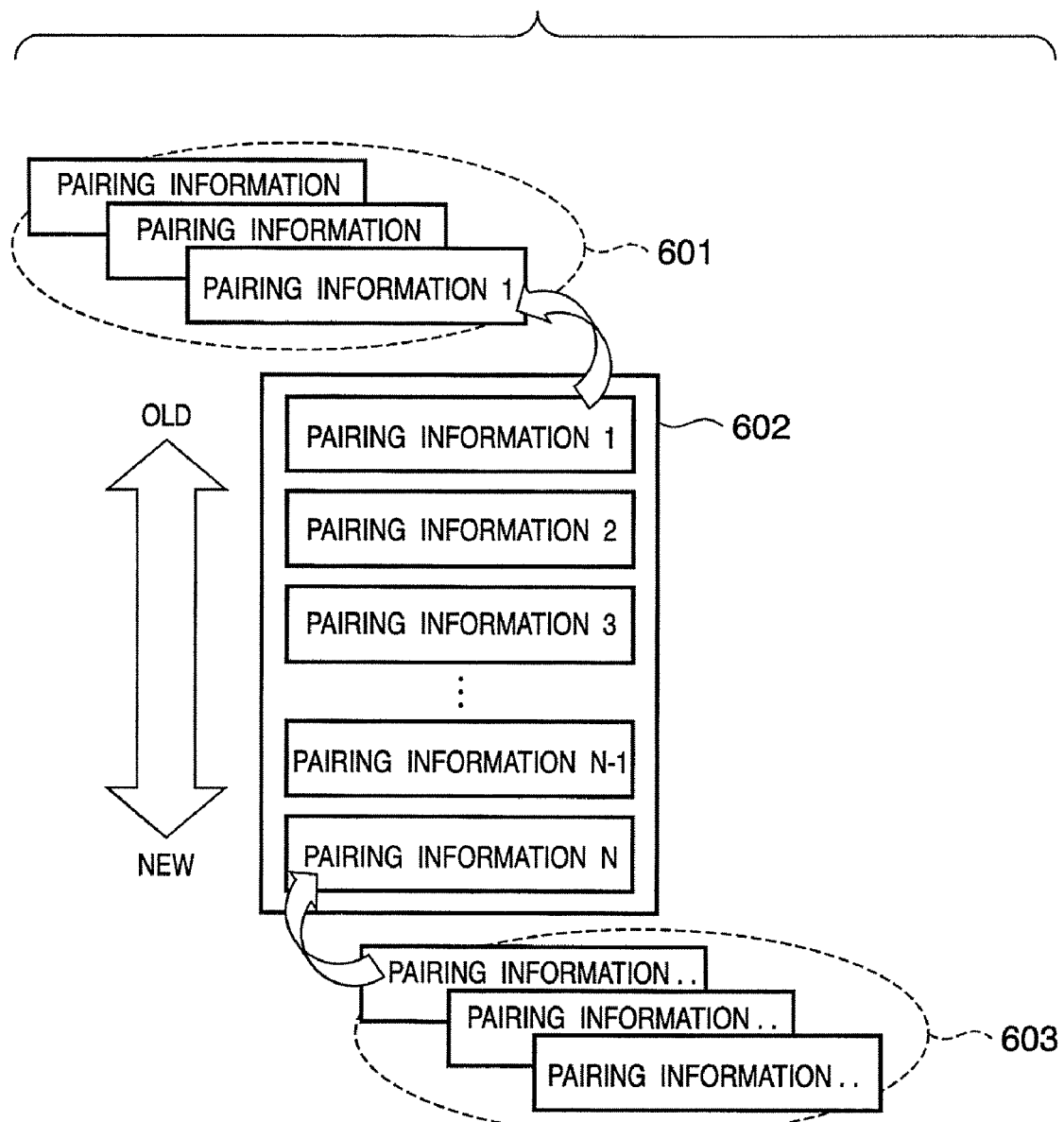
FIG. 6 is a diagram illustrating an example of the composition of a table that manages and stores pairing information.

FIG. 6 is a diagram illustrating an example of the composition of a table that manages and stores pairing information. In the example shown in FIG. 6, N is assumed to be the number of items of pairing information that can be stored. In general, however, the number is 8 to 16, and not that much pairing information can be stored.

FIG. 6 illustrates a pairing information table 602. "PAIRING INFORMATION 1" stored at the very top of the table is the oldest (the pairing information stored at the very beginning), and "PAIRING INFORMATION N" at the bottom is the latest pairing information.

Accordingly, if new pairing information 603 is added, the oldest stored "PAIRING INFORMATION 1" overflows from the pairing information table 602 in order of age, as indicated at 601, and is deleted. The number of items of pairing information that can be stored in the pairing information table 602 is always the N latest items of information.

In this embodiment, the "pairing information" being managed by a single table usually is divided into two parts, namely information stored just as heretofore as "pairing information" and "pairing information to be deleted" upon making a temporary connection.

Figure 7:
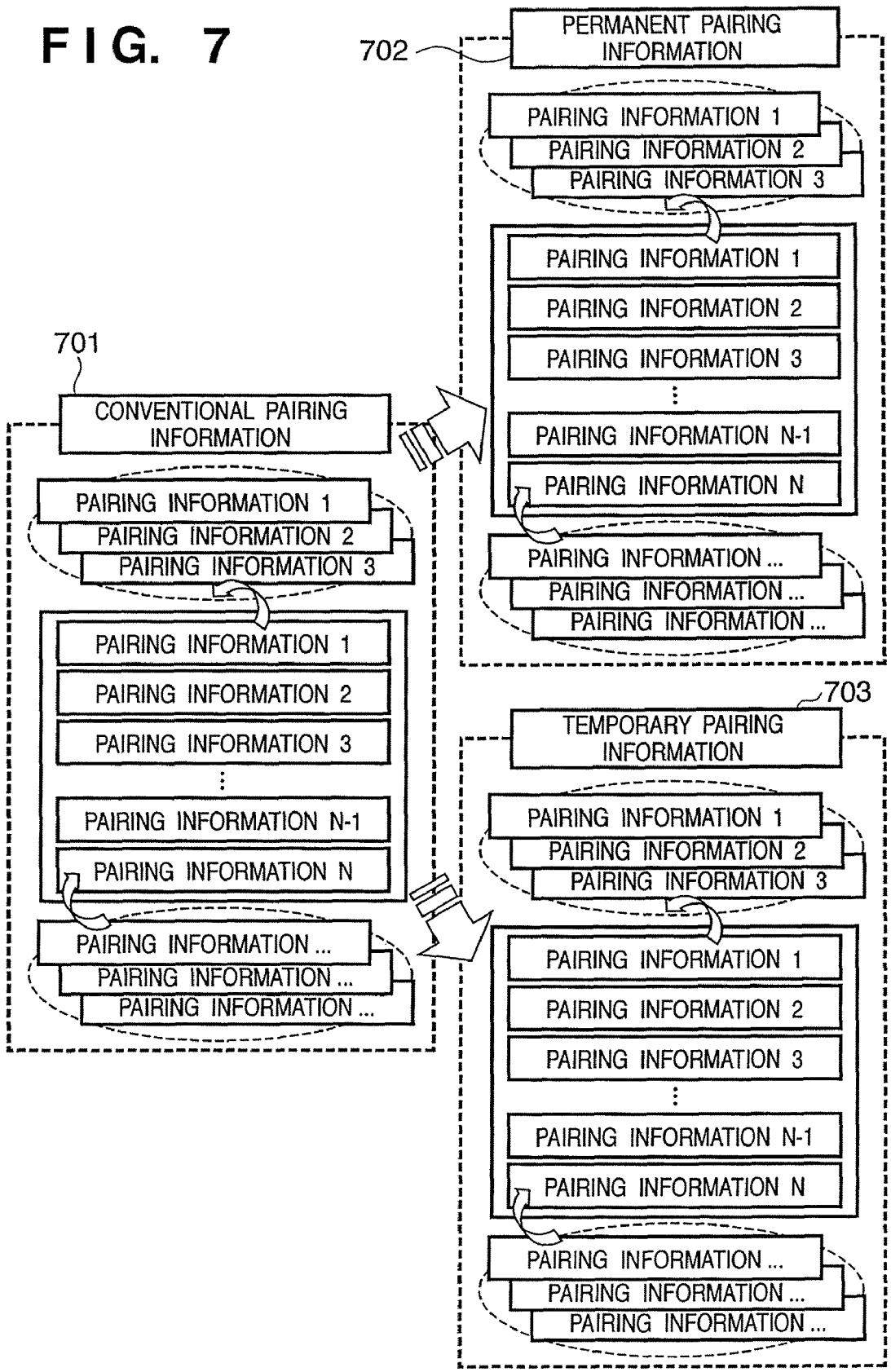
FIG. 7 is a diagram illustrating an example of the composition of a pairing information management table according to this embodiment.

FIG. 7 is a diagram illustrating an example of the composition of a pairing information management table according to this embodiment. As illustrated in FIG. 7, a table 701 for managing pairing information is divided into two tables 702 and 703. Table 702 stores pairing information with respect to "stationary PIN codes", and table 703 stores pairing information with respect to "temporary PIN codes" issued for the purpose of making a temporary connection.

Accordingly, by separately managing stationary pairing information, only one of which exists in a printing apparatus, and temporary pairing information, a problem in which host information usually connected by a permanent PIN code is erased, thereby making connection impossible, can be solved.

Figure 8:
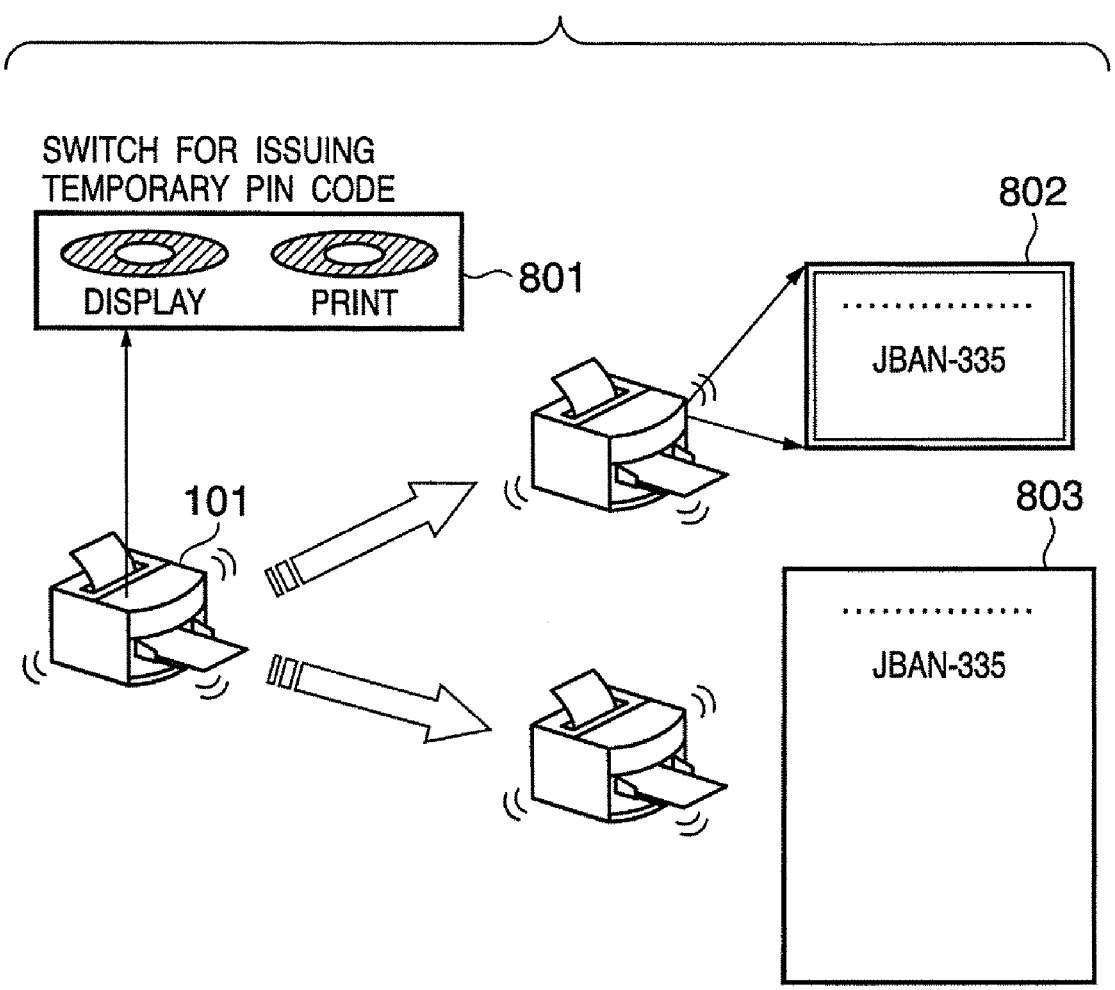
FIG. 8 is a diagram useful in describing a procedure for issuing a "temporary PIN code" necessary to connect to a printing apparatus.

FIG. 8 is a diagram useful in describing a procedure for issuing a "temporary PIN code" necessary to connect to a printing apparatus. A switch 801 shown in FIG. 8 is for issuing a "temporary PIN code" necessary in terms of connecting to the printing apparatus 101. More specifically, depending upon the volition of the user, this information can be issued in switched fashion either by being printed on paper 803 or displayed on a display screen 802 if the apparatus has a display device.

Figure 9:
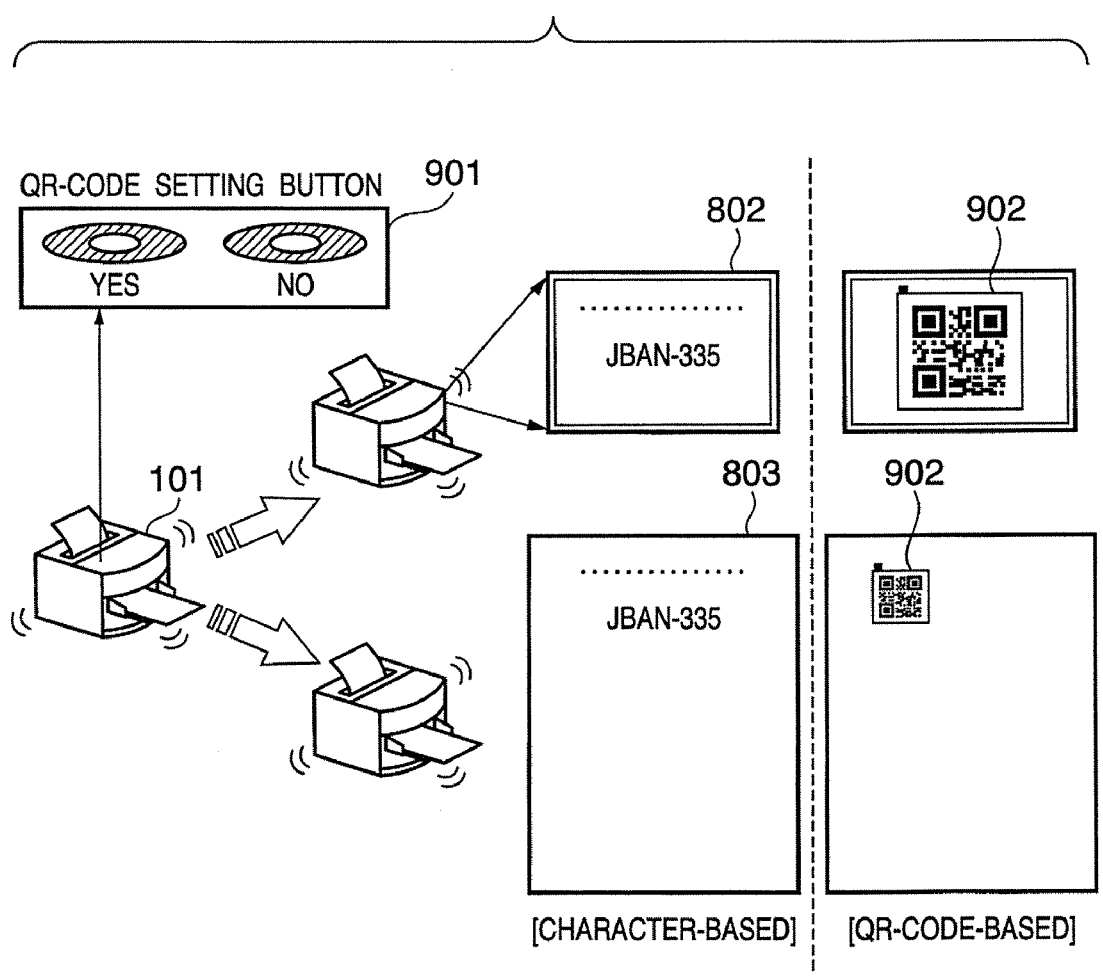

FIG. 9 is a diagram illustrating a case where the "temporary PIN code" shown in FIG. 8 is converted to a QR code or the like. A switch 901 shown in FIG. 9 sets whether to use a "QR code" as a method of providing a PIN code. By turning on the QR-code setting button 901, "DISPLAY" is pressed using the "temporary PIN code issuing switch" 801 illustrated in FIG. 8. As a result, if the printing apparatus 101 is equipped with a display device, a "temporary PIN code" 902 is displayed in the form of a QR code on the display screen 802.

In a case where the printing apparatus 101 is not equipped with a display device, the "temporary PIN code" 902 will be printed on the paper 803 automatically if "DISPLAY" is pressed.

Figure 10:
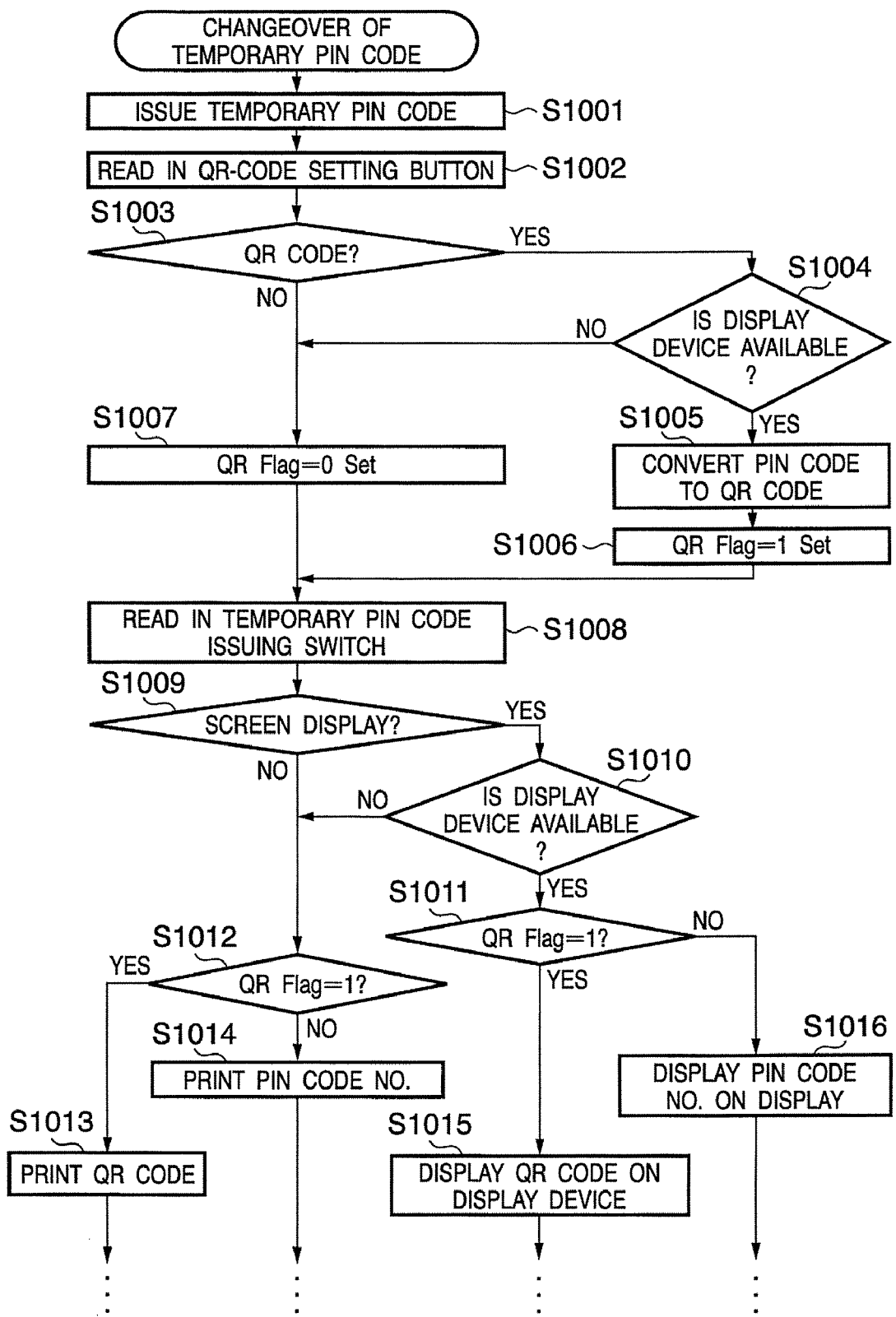
FIG. 10 is a flowchart illustrating processing for presenting connection information in a printing apparatus according to this embodiment.

FIG. 10 is a flowchart illustrating processing for presenting connection information in a printing apparatus according to this embodiment. The processing of this flowchart is executed to acquire a temporary PIN code. First, at step S1001, the print setting-value controller 414 generates a temporary PIN code within the printing apparatus 101. Next, the content set by the "QR-code setting button 901" is read in at step S1002 and the set value is checked at step S1003. If presentation in the form of a QR code has been set, then control proceeds to step S1004. Here it is determined whether the printing apparatus 101 has a display device. If the determination made is that the apparatus has the display device, control proceeds to step S1005 and the two-dimensional bar code generator 413 converts the PIN code that was issued at step S1001 to a QR code. A QR flag is set to "1" at step S1006.

If it is determined at step S1003 that temporary PIN code is to be presented as is in the form of characters and not as a QR code, or if it is determined at step S1004 that the printing apparatus does not have a display device, then control proceeds to step S1007, where the QR flag is reset to "0".

Next, the value of the "temporary PIN code issuing switch 801" is read in at step S1008 and the value thereof is checked at step S1009. In a case where "screen display" is sought, control proceeds to step S1010, where it is determined whether the printing apparatus has a display device. If the apparatus has a display device ("YES" at S1010) and the QR flag is "1" ("YES" at S1011), then control proceeds to step S1015. Here the QR code to which the temporary PIN code has been converted is displayed on the display device.

If the apparatus has a display device ("YES" at S1010) and the QR flag is not "1" ("NO" at S1011), then control proceeds to step S1016. Here the temporary PIN code is displayed on the display screen.

If the decision rendered at step S1009 is that a screen display is not sought, control proceeds to step S1012, where it is determined whether the QR flag has been set. If the QR flag is "1", control proceeds to step S1013 and the temporary PIN code is printed on paper in the form of a QR code. If the QR flag is not "1", then control proceeds to step S1014, whereby the temporary PIN code is printed on paper in the form of characters.

In the flowchart of FIG. 10, the value of the PIN code is either printed on paper or displayed on a screen depending upon the content set by the "temporary PIN code issuing switch 801" at step S1009. However, the screen display may be presented automatically, without reading in the content of switch 801, in a case where the printing apparatus has a screen display function. Further, if information cannot be read from the screen for some reason, it is possible to change over to printing at the moment "PRINT" on the "temporary PIN code issuing switch 801" is pressed.

Described in this embodiment is a method in which two types of PIN codes, namely a permanent PIN code and a temporary PIN code, are utilized to prevent stationary PIN code information in pairing information, which is originally supported, from being erased by a temporary connection. This is based upon the fact that a temporary PIN code for performing a temporary connection is issued, management is performed upon division into a management table and permanent PIN code information, and the temporary PIN code is deleted after being used one time.

However, in an embodiment set forth below, an example of application will be described in which when a temporary PIN code is issued, various conditions are attached to enable a broader range of utilization.

Figure 11:
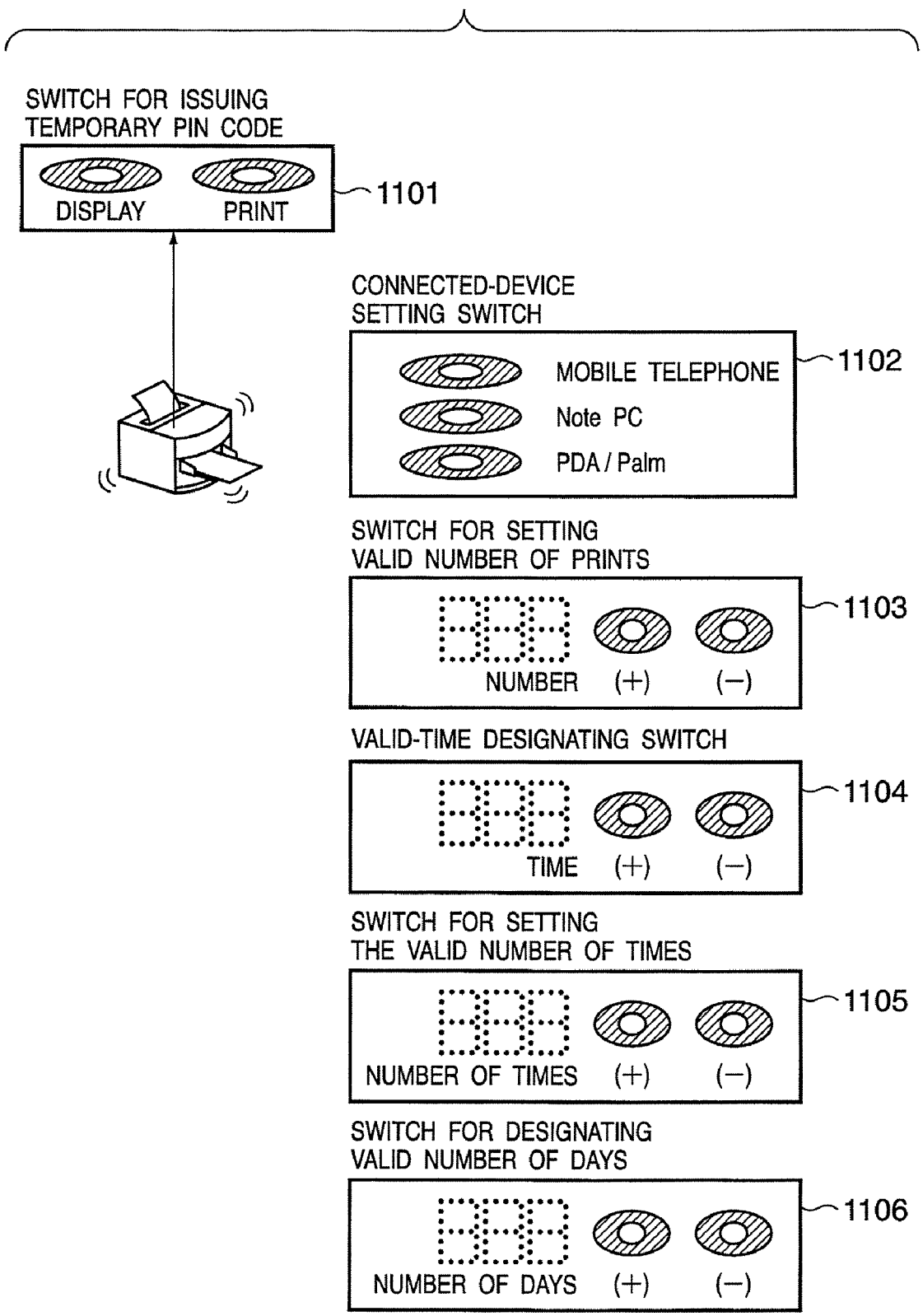
FIG. 11 is a diagram useful in describing an example of application when a temporary PIN code is issued in this embodiment.

FIG. 11 is a diagram useful in describing an example of application when a temporary PIN code is issued in this embodiment. Various switches are illustrated in FIG. 11. These include a switch 1101 identical with the temporary PIN code issuing switch 801 shown in FIG. 8, a connected-device setting switch 1102, a switch 1103 for setting a valid number of print pages, a valid-time designating switch 1104, a switch 1105 for setting the valid number of times printing is performed, and a switch 1106 for designating a valid number of days. On the switches 1103 to 1106, the display is incremented by pressing (+) and is decremented by pressing (−). The value set is displayed by a 7-segment display located on the left side of each setting switch. The settings are checked and are reflected as additional information appended to a "temporary PIN code" issued simultaneously by the printing apparatus.

The role of the connected-device setting switch 1102 is very important in this embodiment. By making clear the type of connected device in advance, it is possible to predict the frequency with which connection will be made and to apply a limitation from the start irrespective of the other switches.

By way of example, assume that the connected device is a mobile telephone. In view of the nature of a mobile telephone, it may be construed that printing will be used infrequently and that casual use from time to time will be high. Accordingly, the temporary PIN code used from the beginning is issued as one for only a single connection and print. Conversely, in case of a notebook personal computer, there is the possibility that once the computer is connected and performs printing, such printing will be repeated periodically. Accordingly, it is possible to issue a temporary PIN code having a valid time period of one day (24 hours).

FIG. 12 is a diagram illustrating the structure of a database of temporary PIN codes issued by a printing apparatus in accordance with circumstances. As illustrated in FIG. 12, temporary PIN codes are managed for every connected device. The major difference from permanent PIN code information is that a temporary PIN code differs depending upon the connected device.

Since one temporary PIN code has one-to-one correspondence with one device, a particular device can be specified and managed by the PIN code prevailing at the time of the connection.

The leftmost column in FIG. 12 indicates serial numbers that have been assigned to devices. PIN code numbers indicated at 1201 are temporary PIN codes that the printing apparatus has assigned to connected devices. Similarly, conditions 1204 to 1208 that have been set for each of the PIN codes have been stored as values set by the setting switches illustrated in FIG. 11.

Described next will be processing in which a connected device is set by the connected-device setting switch 1102 illustrated in FIG. 11 and a temporary PIN code is issued upon setting number of prints, valid time, etc., using the various setting switches.

Figure 13A:
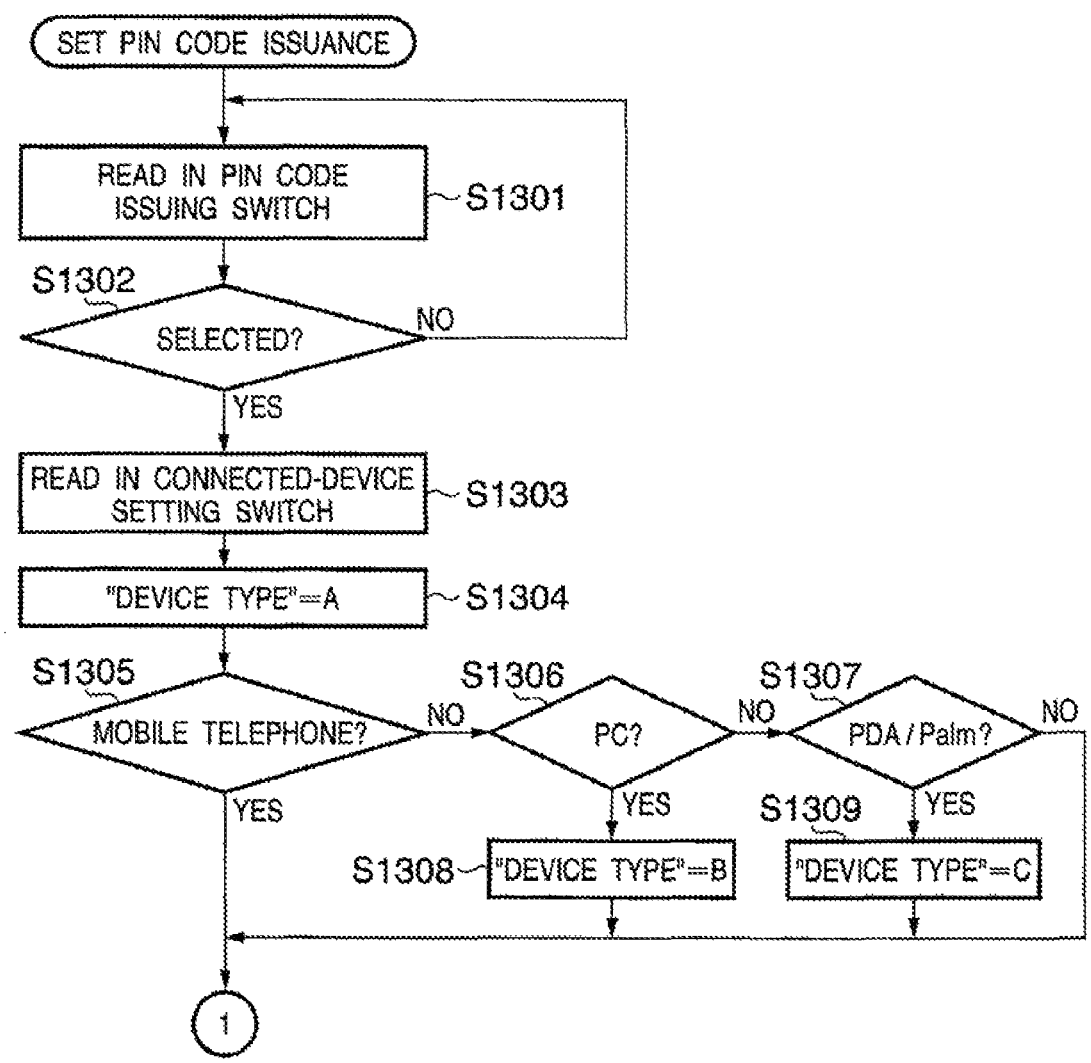
FIGS. 13A and 13B are flowcharts illustrating processing for setting issuance of PIN codes in this embodiment.
Figure 13B:
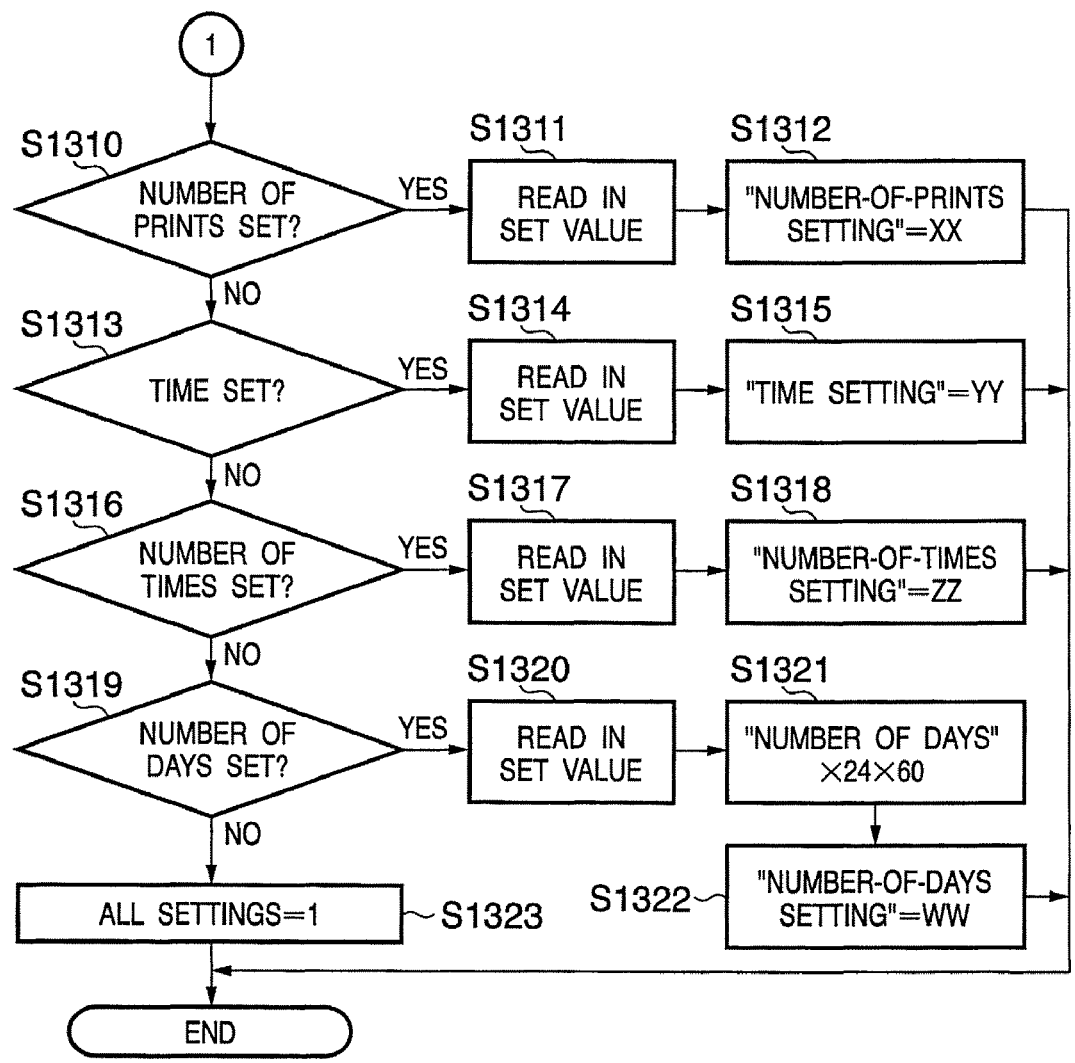

FIGS. 13A and 13B are flowcharts illustrating processing for setting issuance of PIN codes in this embodiment. First, at step S1301, the status of the temporary PIN code issuing switch 1101 is read in. If it is confirmed at step S1302 that the switch for display or printing has been pressed, then control proceeds to step S1303. Here the status of the connected-device setting switch 1102 is read in. Then, at step S1304, "DEVICE TYPE" is set to "A", which is the identification number of a mobile telephone, as an initial setting.

Next, at step S1305, it is determined whether the setting read in at step S1303 is that of a mobile telephone. If the setting is that of a mobile telephone, control proceeds to step S1310; otherwise, control proceeds to step S1306, where it is determined whether the setting is that of a notebook personal computer. If it is a notebook personal computer, then control proceeds to step S1308, where "B", which is the identification number of the personal computer, is set as "DEVICE TYPE". If the setting is not that of a notebook personal computer, control proceeds to step S1307, where it is determined whether the setting is that of a PDA/Palm. If it is PDA/Palm, control proceeds to step S1309, where "C", which is the identification number of the PDA/Palm, is set as "DEVICE TYPE".

Next, at steps S1310 to S1323, the conditions that have been set for each PIN code are checked. It is determined at step S1310 whether a valid number of prints has been set. If this has been set, then the value is read in at step S1311 and the value is stored as a "NUMBER-OF-PRINTS SETTING" at step S1312. It is determined at step S1313 whether a valid time has been designated. If this has been designated, then the value thereof is read in at step S1314 and this value is stored in 1-minute units as a "TIME SETTING".

It is determined at step S1316 whether a valid number of times printing is performed has been set. If this has been set, then the value thereof is read in at step S1317 and this value is stored as a "NUMBER-OF-PRINTING TIMES" setting. It is determined at step S1319 whether a valid number of days has been designated. If this has been designated, then the value thereof is read in at step S1320. This value is multiplied by "24 hours×60 minutes" and the valid time is converted to minute units at step S1321. The valid time is stored as a "NUMBER-OF-DAYS SETTING" at step S1322. If nothing has been set, then all of the condition setting values (the "NUMBER-OF-PRINTS SETTING", "TIME SETTING", "NUMBER-OF-PRINTING-TIMES SETTING" and "NUMBER-OF-DAYS SETTING") are set to "1" at step S1323.

In a case where the content of the table shown in FIG. 12 is put into the form of a database in units of the connected devices and a connection request is generated subsequently by a temporary PIN code, then this connected device can be specified. Further, printing can be managed in relation to conditions managed on a per-PIN-code basis.

FIG. 14 is a flowchart illustrating PIN-code analyzing processing at the time of printing in this embodiment. At step S1401, information (BD address, device name, etc.) that has been sent from the connected device is analyzed. Then, at step S1402, reference is had to the PIN code database, which is shown in FIG. 12, managed for every temporary PIN code. It is determined at step S1403 whether the transmitted PIN code exists in the database. If the transmitted PIN code is not found in the temporary PIN code database, control returns to step S1401 and the printing apparatus does not implement a connecting operation.

If the PIN code is found to exist at step S1403, then control proceeds to step S1404. Here printing conditions conforming to the PIN code that has arrived, e.g., such items as the number of prints that can be made and valid time period, are read in from the PIN code. This is followed by step S1405, at which a pointer is made to conform to the beginning of the database of the transmitted PIN code and determines whether a number-of-prints setting exists in the information regarding this PIN code. If the number-of-prints setting is found, control proceeds to step S1411. Here the setting is decremented by the number of prints that are printed this time. Whether the remaining number of prints is zero or negative is determined at step S1412. If the number is zero or negative, control proceeds to step S1413. Here the temporary PIN code is deleted because connection and printing cannot be performed from this point onward in a case where a print request is received by the same PIN code. If there are prints that can still be made, control proceeds to step S1414, where the remaining number is made a "NUMBER-OF-PRINTS SETTING" corresponding to this PIN code.

If it is found at step S1405 that there is no number-of-prints setting, control proceeds to step S1406, where it is determined whether there is a limit relating to the number of times printing is performed. If there is such a limit, control proceeds to step S1407, where the number is decremented, and then to step S1408, where it is determined whether the remaining number of times is zero. If the number is zero, control proceeds to step S1409. Here this PIN code is deleted from the temporary PIN code database in order to invalidate connection by this temporary PIN code from thin point onward. If the remaining number of times is not zero, then control proceeds to step S1410, where the remaining number of times is made a "NUMBER-OF-PRINTING-TIMES SETTING" corresponding to this PIN code.

In FIG. 14, it is described that whether a PIN code used at the time of a connection is correct or not is determined and, if the PIN code is found to valid, processing is executed to change attribute information, namely number of prints and time of times printing is performed, among the setting values accompanying this PIN code. However, there are also time-related items as setting values that accompany a temporary PIN code.

In particular, recent printers come equipped with a plurality of functions such as a facsimile function. Such a printer therefore has a real-time clock function, and a "time limit" also is a significant limitation in terms of a limitation on use.

Figure 15:
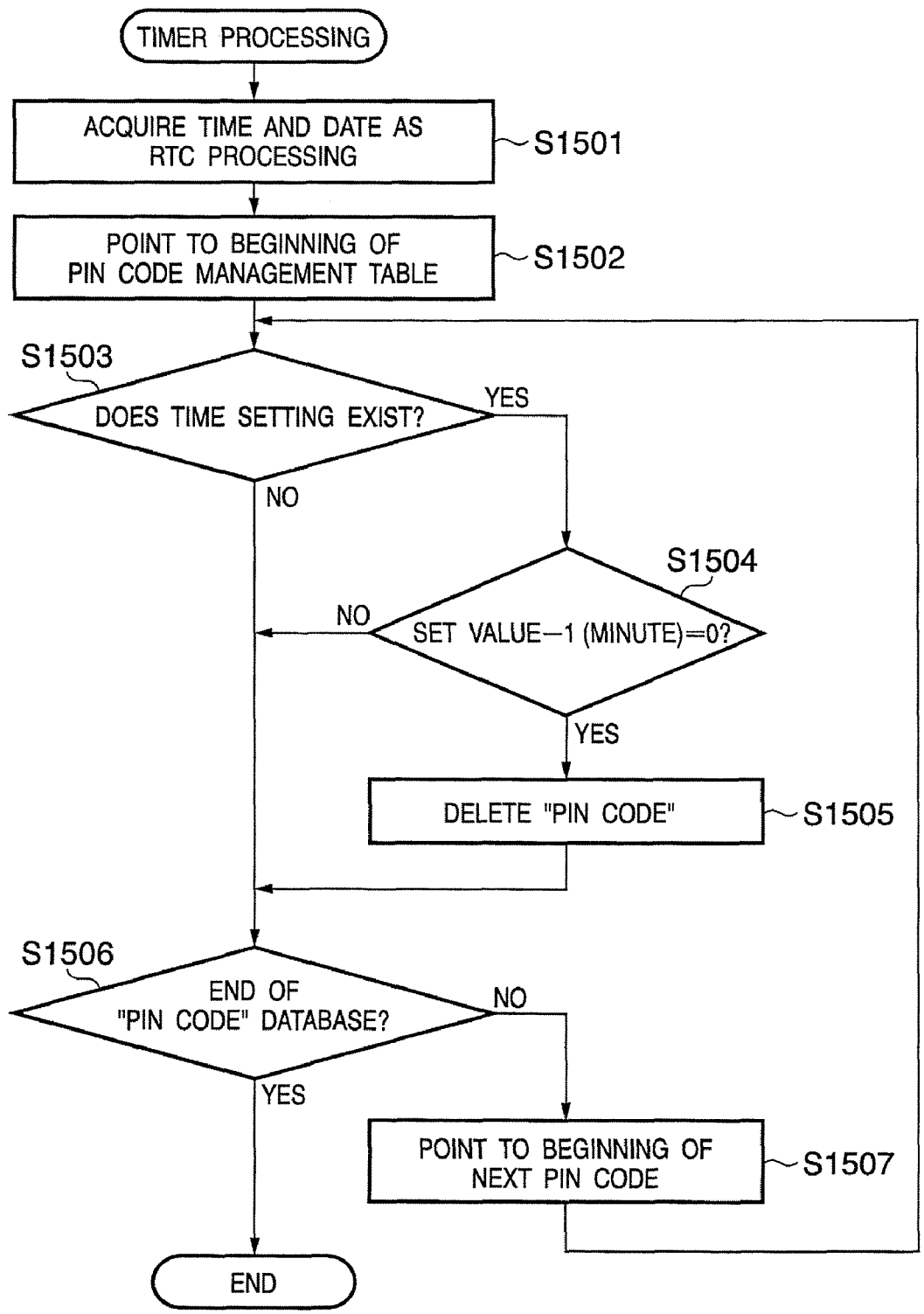
FIG. 15 is a flowchart illustrating processing for setting time-related valid time and valid number of days.

FIG. 15 is a flowchart illustrating processing for setting time-related valid time and valid number of days. These time-related printing limitations are not information managed based upon the timing of a connection but relate to passage of time irrespective of whether or not a connection is made based upon an issued temporary PIN code. These are managed during time-interrupt processing within the printing apparatus. FIG. 15 is the flow of processing relating to additional processing to be added to time management processing in an ordinary printing apparatus. Further, this example of timer processing assumes real-timer processing that is started up whenever one minute elapses.

Recent printers come equipped with a timekeeping function. The present date and time are read in at step S1501 in FIG. 15. Next, the leading address of the temporary PIN code database is mapped at step S1502. Whether a "time setting" exists in printing conditions that have been set for the temporary PIN code is checked at step S1503 based upon a pointer that has been set. In a case where a "time setting (minutes)" has been set, control proceeds to step S1504, where the time setting is decremented. Since this real-timer processing is started up in one-minute units, "temporary PIN code valid time (minutes)" is decremented every time. Accordingly, if the value obtained by decrementing becomes zero at step S1504, this means that the valid time period has elapsed. Then, at step S1505, all of the information concerning this temporary PIN code is deleted.

Next, at step S1506, it is determined whether the "time settings" for all PIN codes that have been registered in the temporary PIN code database have been checked. If the check is not finished, control proceeds to step S1507. Here the address pointer of the PIN code checked is changed to the next address, control returns to step S1503 and the above-described processing is repeated.

Thus, in a case where a time-related limitation has been applied to a temporary PIN code by real-time clock processing, valid time is decremented automatically irrespective of whether there is a connection to a host. If valid time is zero minutes, the PIN code is erased from the PIN code database.

Accordingly, by adding a valid operation limitation and expiration date to a PIN code issued temporarily, the range of application of a temporary PIN code can be broadened.

Further, a host may be distinguished and a valid time period of a PIN code limited by a data transfer protocol used when transmitting device name and data acquired from a host that implements a connection using an issued temporary PIN code.

Figure 16:
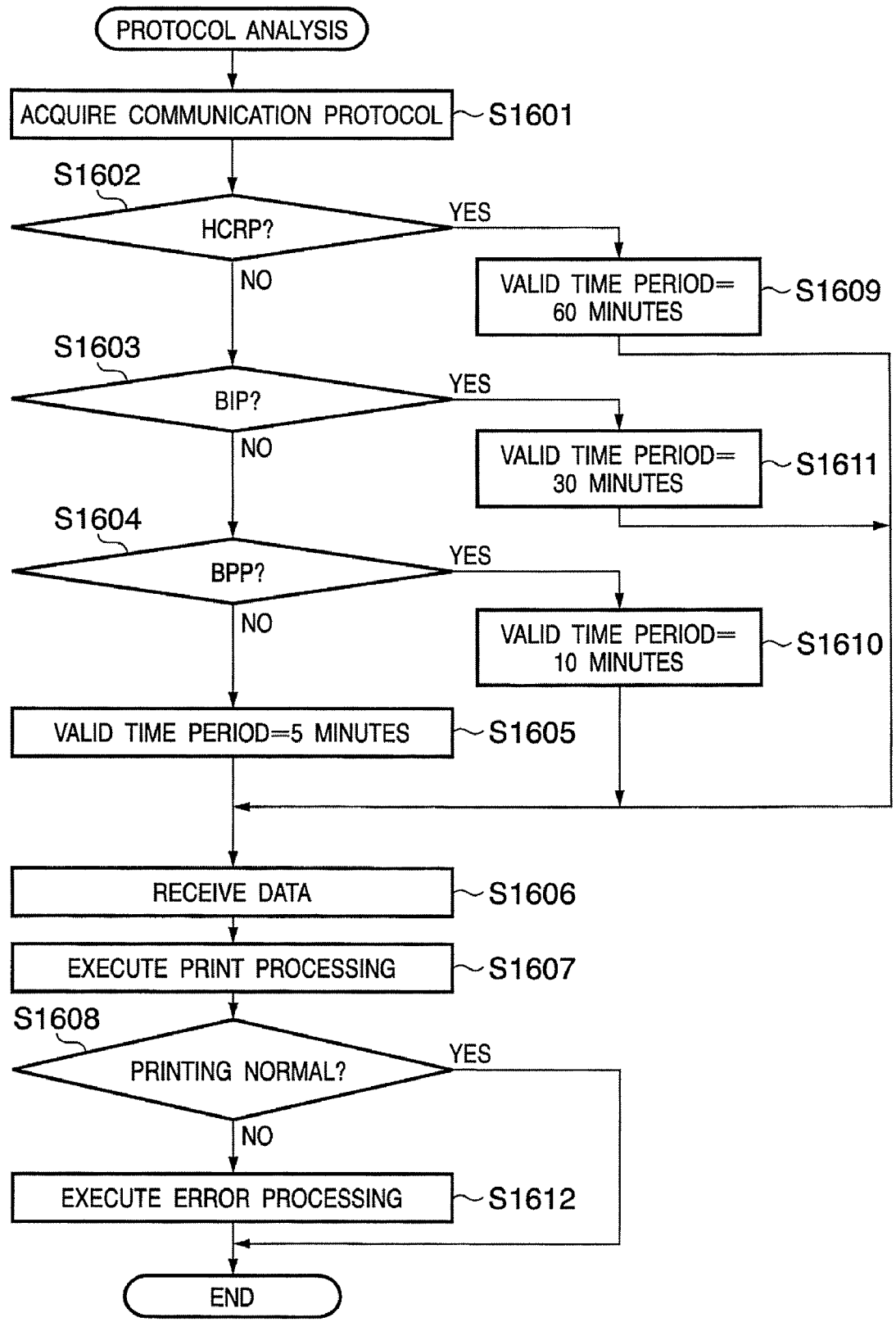
FIG. 16 is a flowchart illustrating processing for automatically changing over valid time of a temporary PIN code by a profile capable of being analyzed by Bluetooth (registered trademark).

FIG. 16 is a flowchart illustrating processing for automatically changing over valid time of a temporary PIN code by a profile capable of being analyzed by Bluetooth (registered trademark). In this example, the "valid time period" is set counting from the time of the last print request in order to simplify the description.

First, at step S1601, the communication profile of the host connected using a previously issued temporary PIN code is acquired. In the case of an HCRP (Hardcopy Cable Replacement Profile) often used by personal computers in making a connection ("YES" at step S1602), control proceeds to step S1609 and the "valid time period" of this temporary PIN code is set to 60 minutes.

In the case of a BIP (Basic Imaging Profile) used by digital cameras and PDAs, etc., control proceeds to step S1611, where the "valid time period" of this temporary PIN code is set to 30 minutes. In the case of a BPP (Basic Printing Profile) used by mobile telephones, control proceeds to step S1610, where the "valid time period" of this temporary PIN code is set to 10 minutes.

In a case that does not apply to any of the foregoing, control proceeds to step S1605. Here the analysis is that printing is using an "unknown profile" and the "valid time period" of this temporary PIN code is set to 5 minutes.

By such processing, the valid time period of a temporary PIN code relating to a host can be set automatically. Thereafter, data to actually be printed is received at step S1606 and print processing is executed at step S1607. If it is determined at step S1608 that printing could be performed normally, then processing is terminated as is. If an error occurs, control proceeds to step S1612, where error processing is executed and then processing is terminated.

In a system in which terminals and a printing apparatus are connected using a wireless function and printing is then performed, usually individual connection passwords such as PIN codes set on a per-device basis are used in order to apply a connection limitation. Once a connection has been made normally in such a system, the pairing information is stored. From the second time onward, a connection can be made is simple fashion without inputting a PIN code or the like at the time of the connection. However, the pairing information thus stored is limited. When the limit is exceeded, the connection information is erased in order of decreasing age.

There will be an increase in situations where printing is performed upon making a temporary connection between printers and mobile terminals, etc., which will become even more widespread in the future.

In accordance with this embodiment, a temporary connection can be made without deleting the pairing information between a communication apparatus such as a printing apparatus and a usually connectable terminal. Accordingly, if the present invention is applied to a printing apparatus, a temporary connection can be made to this printing apparatus and printing can be carried out.

Further, in relation to such a temporary connection, a wide variety of printing limitations can be applied by using a PIN code obtained by adding conditions such as a valid time period and limitation on number of prints to a PIN code necessary for making the connection.

The present invention may be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a recording medium storing the program codes of the software for performing the functions of the foregoing embodiment to a system or an apparatus, reading the program codes with a computer (e.g., a CPU or MPU) of the system or apparatus from the recording medium, and then executing the program codes.

In this case, the program codes per se read from the recording medium implement the novel functions of the embodiment and the recording medium storing the program codes constitutes the invention.

Examples of recording media that can be used for supplying the program code are a flexible disk, hard disk, optical disk, magneto-optical disk, CD-ROM, CD-R, magnetic tape, non-volatile type memory card or ROM, etc.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written to a memory provided in a function expansion board inserted into the computer or in a memory provided in a function expansion unit connected to the computer, a CPU or the like contained in the function expansion board or function expansion unit performs a part of or the entire process based upon the designation of program codes and implements the function of the above embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-048974, filed Feb. 24, 2006, which is hereby incorporated by reference herein in its entirety.

What is claimed is:

1. A printing apparatus capable of being wirelessly connected to a communication apparatus, comprising:
a setting device that sets a type of a partner apparatus to be wirelessly connected, wherein the type is selected by a user from multiple types including a mobile telephone and a computer;
a generating device that automatically generates, in a case that the type of the partner apparatus set by the user with the setting device is the mobile telephone, first connection information which limits connection with the partner apparatus by a number of connection times, and automatically generates, in a case that the type of the partner apparatus set by the user with the setting device is the computer, second connection information which limits connection with the partner apparatus by a time period;
an output device that outputs the first and second connection information to at least one of a display device and a printing device; and
a connecting limitation device that limits a wireless connection with the partner apparatus based upon the first and second connection information.

2. The apparatus according to claim 1, wherein the generating device generates different items of temporary connection information with regard to respective ones of a plurality of other communication apparatuses, and manages the temporary connection information.

3. The apparatus according to claim 1, further comprising a deleting device that deletes the first and second connection information.

4. The apparatus according to claim 3, wherein, in a case where another communication apparatus has issued a connection request by the first connection information, the deleting device deletes the first connection information when the number of connection times reaches a predetermined number of connection times.

5. The apparatus according to claim 3, wherein the deleting device deletes the second connection information when the time period expires.

6. The apparatus according to claim 1, wherein the output device outputs the first and second connection information to the display device or the printing device according to a user instruction.

7. The apparatus according to claim 1, wherein the output device outputs the first and second connection information as characters or codes.

8. A method of wirelessly connecting a printing apparatus to a communication apparatus, comprising:
setting a type of a partner apparatus to be wirelessly connected, wherein the type is selected by a user from multiple types including a mobile telephone and a computer;
automatically generating, in a case that the type of the partner apparatus set by the user is the mobile telephone, first connection information which limits connection with the partner apparatus by a number of connection times, and automatically generating, in a case that the type of the partner apparatus set by the user is the computer, second connection information which limits connection with the partner apparatus by a time period;
outputting the first and second connection information to at least one of a display device and a printing device; and
limiting a wireless connection with the partner apparatus based upon the first and second connection information.

9. The method according to claim 8, wherein different items of connection information are generated with regard to respective ones of a plurality of other communication apparatuses, and the connection information is managed.

10. The method according to claim 8, further comprising deleting the first and second connection information.

11. The method according to claim 10, wherein, in a case where another communication apparatus has issued a connection request by the first connection information, the first connection information is deleted when the number of connection times reaches a predetermined number of connection times.

12. The method according to claim 10, wherein the second connection information is deleted when the time period expires.

13. The method according to claim 8, wherein the output device outputs the first and second connection information to the display device or the printing device according to a user instruction.

14. The method according to claim 8, wherein the output device outputs the first and second connection information as characters or codes.

15. A non-transitory computer-readable recording medium storing a computer-executable program of instructions for causing a computer to perform a method of wirelessly connecting a printing apparatus to a communication apparatus, the method comprising:
setting a type of a partner apparatus to be wirelessly connected, wherein the type is selected by a user from multiple types including a mobile telephone and a computer;
automatically generating, in a case that the type of the partner apparatus set by the user is the mobile telephone, first connection information which limits connection with the partner apparatus by a number of connection times, and automatically generating, in a case that the type of the partner apparatus set by the user is the computer, second connection information which limits connection with the partner apparatus by a time period;
outputting the first and second connection information to at least one of a display device and a printing device; and
limiting a wireless connection with the partner apparatus based upon the first and second connection information.

16. The apparatus according to claim 1, further comprising:
a conversion device that converts the first and second connection information generated by the generating device into a QR code,
wherein the output device selectively displays or prints the first and second connection information converted into the QR code.

* * * * *